Oct. 8, 1940.　　F. R. MAXWELL　　2,216,953
SPLIT SLEEVE VALVE
Filed Oct. 20, 1938
Fig. 1,
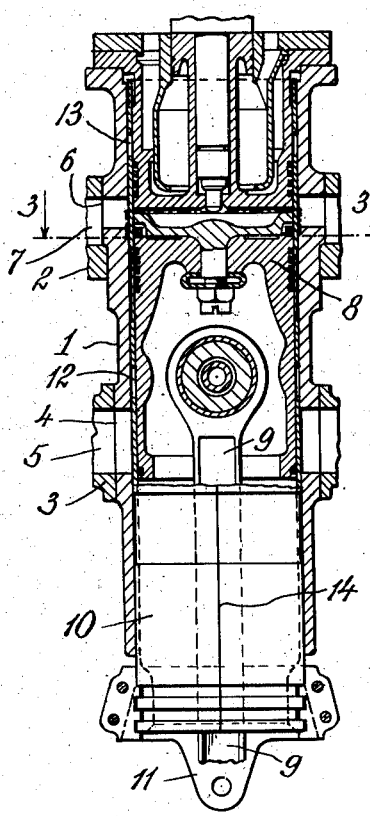
Fig. 2,
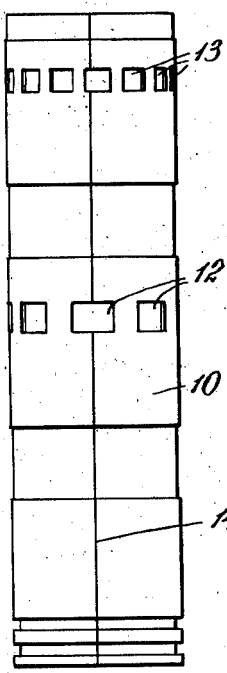
Fig. 3,
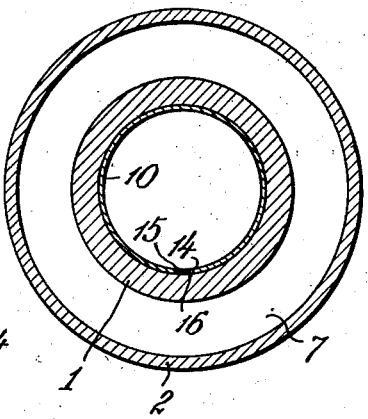
Fig. 6,
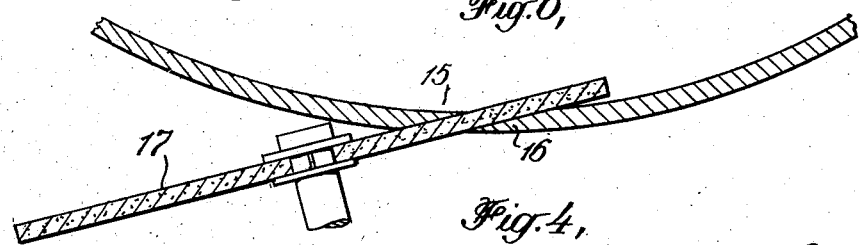
Fig. 4,
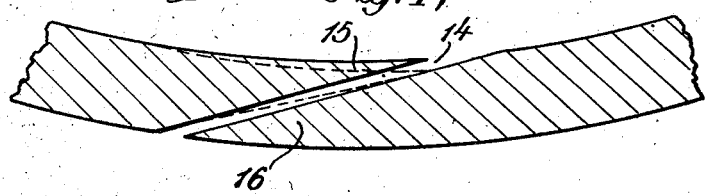
Fig. 5,
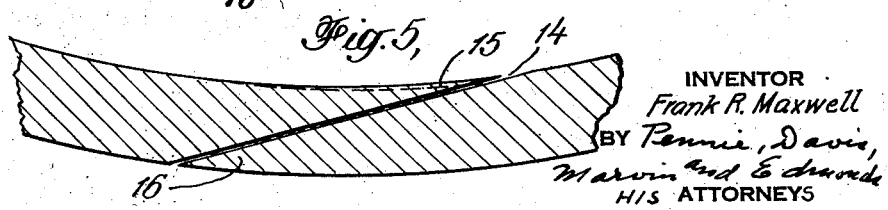
INVENTOR
Frank R. Maxwell
BY Pennie, Davis,
Marvin and Edmonds
HIS ATTORNEYS Patented Oct. 8, 1940

2,216,953

UNITED STATES PATENT OFFICE 2,216,953

SPLIT SLEEVE VALVE

Frank R. Maxwell, Rose Valley, Pa.

Application October 20, 1938, Serial No. 236,007

5 Claims. (Cl. 123—75)

This invention relates to sleeve valves for controlling the admission and exhaust ports of internal combustion engines. More particularly the invention relates to sleeve valves of the type which are split or slitted longitudinally from end to end, and it has for its object the provision of an improved construction for such valves.

Split sleeve valves are preferable to continuous tubular sleeve valves as they more readily conform to the cylinder and thus overcome the problems of clearance and out-of-roundness and minimize the problem of concentricity. At the same time they overcome the problems arising through differential expansion of piston, sleeve valve and cylinder caused by variations in temperature. Splitting the sleeve also simplifies the lubrication problem. Many previous attempts have been made to construct a satisfactory split sleeve valve. In all of these prior constructions, however, the "blow-by" or leakage around the piston through the cut or slit in the sleeve has been considerable, resulting in serious loss of compression and power. Thus the object of the present invention is to provide a split sleeve valve which is so constructed as to substantially prevent or eliminate such loss of compression, thereby making the split sleeve type of valve better adapted for use in compression-ignition engines.

The invention will be understood by reference to the accompanying drawing and the following detailed description illustrating one embodiment of the invention by way of example. It will be further understood that the invention is not limited to the particular construction disclosed in this example.

Referring now to the drawing:

Fig. 1 is a vertical longitudinal section through an engine cylinder, which is provided with the split sleeve of my invention;

Fig. 2 is a view in elevation of the sleeve removed from the engine cylinder;

Fig. 3 is a transverse section taken on broken line 3—3 of Fig. 1;

Figs. 4 and 5 are enlarged views of a portion of Fig. 2 showing the cut or slit in the sleeve under different conditions of operating temperature; and Fig. 6 is a view illustrating one means of finishing the surfaces of the cut or slit.

Referring now to the accompanying drawing, the cylinder liner 1 is mounted in the customary fashion in the engine frame, being shrunk into circular openings within two frame members 2 and 3. The exhaust ports 4 of the engine cylinder register with exhaust passages 5 in members 3 and the scavenging and air admission ports 6 register with similar passages 7 in frame members 2.

Control of exhaust and air admission are effected by means of a tubular sleeve valve 10 which is reciprocated within the cylinder by suitable mechanism attached to the connecting devise 11 at its lower end. A piston 8 of any appropriate type is arranged to reciprocate within the sleeve and is connected with the engine crank (not shown) by connecting rod 9. In the position shown in Fig. 1, piston 8 is at the top of its stroke and the working stroke of the engine is about to commence. Hence, both the air admission and exhaust ports are closed. When, however, sleeve valve 10 is reciprocated towards its lowermost position, the exhaust ports 12 therein, first come into registry with the exhaust ports 4 of the cylinder, and subsequently the air admission ports 13 of the valve come into registry with the air admission ports 6 of the cylinder. In this way the cylinder is exhausted of its burned charge, scavenged, and a fresh charge of air is admitted for the next working stroke, the engine illustrated being of the two-stroke cycle type.

The sleeve valve 10 is slit longitudinally from end to end, as indicated at 14 in such a manner as to provide mutually overlapping projections or tongues 15 and 16 (see Figs. 4, 5 and 3) extending throughout the length of the slit, and which are sufficiently yieldable or flexible to permit the pressure within the cylinder to force the tongue 15 into engagement with tongue 16, as shown in dotted lines in Figs. 4 and 5, thereby forming a tight joint between them and substantially preventing "blow-by." One way of constructing such a joint is by means of an angular slit or scarf, as indicated in Figs. 3–6, inclusive. This is a straight cut through the wall of the sleeve but made at as great as possible an angle to the radius of the sleeve so as to make the projections or tongues 15 and 16 as sharp and slender as possible in cross section so that they will have maximum flexibility.

Before cutting the slit 14, the sleeve is machined oversize with respect to the diameter of the cylinder, and thereafter the sleeve is sprung into the cylinder. Before placing the sleeve in the cylinder it may be mounted in a grinding machine with the flat edges of the projections 15 and 16 sprung apart, as shown in Fig. 6, and ground by means of a suitable grinding wheel 17 so as to leave these surfaces flat and true.

Inasmuch as the sleeve valve forms the wall of the cylinder in which the piston reciprocates, the burning gases of the charge are in direct contact with it, and after the engine has warmed up, the temperature of the sleeve reaches a comparatively high value. Provision must be made for the expansion of the sleeve which takes place as its temperature increases. The sleeve is so made that even when operating at its highest temperature, there is a clearance between the edges of the sleeve along the slit 14. This clearance, when the engine is hot, is indicated in Fig. 5. The clearance, when the engine is cold, is indicated in Fig. 4, these figures being drawn to an exaggerated scale to illustrate these clearances and as well as to show how this clearance space is closed by the flexing of the tongue portion 15 during the operation of the engine.

In Fig. 4 in dotted lines is indicated the yielding of the inner edge of the tongue 15 into contact with the surface of tongue 16 under the operating pressure of the engine, even when the engine is cold. In Fig. 5 the extent of movement of the tip of the tongue 15 has been greatly reduced due to the partial closing of the clearance space so that after the engine warms up, the actual flexing movement of tongue 15 is small, but acts effectively to close the passageway through the clearance space which otherwise would convey the gases from the upper to the lower side of the piston in sufficient quantity to interfere with the compression and operating efficiency of the engine.

By means of the present invention, the leakage which ordinarily takes place through the slit of a split sleeve valve is reduced to a point where it is substantially negligible by means of an extremely simple construction. The angular scarf form of slit by means of which I have illustrated the principle of the invention is of sufficient simplicity to present no particular manufacturing problem. It will be understood, however, that changes may be made in the construction of the slit without departing from the spirit of the invention, the scope of which is defined in the appended claims.

It will also be understood that although the invention has been illustrated in connection with an internal combustion engine, it may also be used in other piston and cylinder engines, air compressors and the like, where it is desirable to employ a split sleeve valve.

I claim:

1. The combination of a cylinder, a sleeve valve therein, a piston reciprocating within the sleeve valve, said sleeve valve having a continuous cut extending throughout its length and forming tongues overlapping one another, the inner tongue being flexible throughout the operative length of the cylinder so as to be flexed and forced into sealing contact with the outer tongue by pressure within the cylinder.

2. The combination of a cylinder, a sleeve valve therein, and a piston reciprocating within said sleeve valve, said sleeve valve having an angular cut extending throughout its length and at such an angle through the wall of the sleeve valve as to form tongues overlapping one another, said tongues throughout the operative length of the cylinder being flexible so that the inner tongue will be flexed and forced into sealing contact with the outer tongue by pressure within the cylinder.

3. The combination of a cylinder, a sleeve valve therein, and a piston reciprocating within said sleeve valve, said sleeve valve having an angular cut extending throughout its length, said cut being straight lengthwise of the sleeve and extending through the wall of the sleeve at such an angle as to form tongues overlapping one another, said tongues throughout the operative length of the cylinder being flexible so that the inner tongue will be flexed and forced into sealing contact with the outer tongue by pressure within the cylinder.

4. A split sleeve valve for internal combustion engines and the like comprising a tubular member having a continuous cut extending throughout its length and forming tongues overlapping one another, the inner tongue being flexible throughout the operative length of the member so as to be flexed and forced into sealing contact with the outer tongue by pressure from within.

5. A split sleeve valve for internal combustion engines and the like comprising a tubular member having an angular cut extending throughout its length, said cut extending at such an angle through the wall of said member as to form tongues overlapping one another, said tongues throughout the operative length of said member being flexible so that the inner tongue will be flexed and forced into sealing contact with the outer tongue by pressure from within.

FRANK R. MAXWELL.